US007257705B2

(12) United States Patent
Flam et al.

(10) Patent No.: US 7,257,705 B2
(45) Date of Patent: Aug. 14, 2007

(54) METHOD FOR PRESERVING CHANGES MADE DURING A MIGRATION OF A SYSTEM'S CONFIGURATION TO A SECOND CONFIGURATION

(75) Inventors: Ran J. Flam, Port Monmouth, NJ (US); Daniel Kogan, North Brunswick, NJ (US); Alexander Koganov, North Brunswick, NJ (US)

(73) Assignee: Sparta Systems, Inc., Holmdel, NJ (US)

( * ) Notice: Subject to any disclaimer, the term of this patent is extended or adjusted under 35 U.S.C. 154(b) by 436 days.

(21) Appl. No.: 10/715,278

(22) Filed: Nov. 17, 2003

(65) Prior Publication Data

US 2004/0133610 A1 Jul. 8, 2004

Related U.S. Application Data

(60) Provisional application No. 60/427,319, filed on Nov. 18, 2002.

(51) Int. Cl.
G06F 1/24 (2006.01)
(52) U.S. Cl. .............................. 713/100; 713/1; 713/2
(58) Field of Classification Search ................ 713/1, 713/2, 100
See application file for complete search history.

(56) References Cited

U.S. PATENT DOCUMENTS

| | | | | |
|---|---|---|---|---|
| 3,886,525 | A * | 5/1975 | Brown et al. ............... | 711/147 |
| 4,584,640 | A * | 4/1986 | MacGregor et al. ......... | 707/200 |
| 5,253,344 | A * | 10/1993 | Bostick et al. .................. | 710/8 |
| 5,896,495 | A * | 4/1999 | Stein et al. .................... | 714/38 |
| 5,974,563 | A * | 10/1999 | Beeler, Jr. ....................... | 714/5 |
| 6,101,585 | A * | 8/2000 | Brown et al. ................ | 711/162 |
| 6,240,413 | B1 * | 5/2001 | Learmont ........................ | 707/8 |
| 6,687,698 | B1 * | 2/2004 | Nixon et al. ................... | 707/10 |
| 6,792,556 | B1 * | 9/2004 | Dennis ........................... | 714/6 |
| 7,000,229 | B2 * | 2/2006 | Gere .......................... | 717/169 |
| 2002/0107937 | A1 * | 8/2002 | Iyoki .......................... | 709/217 |
| 2003/0109270 | A1 * | 6/2003 | Shorty ........................ | 455/517 |
| 2003/0188062 | A1 * | 10/2003 | Luse et al. ................... | 710/104 |
| 2004/0015508 | A1 * | 1/2004 | Anonsen ..................... | 707/100 |

(Continued)

OTHER PUBLICATIONS

Sparta Systems, Inc. Trackwise 5.5 Release Notes, 1995-2000, (p. 9).

(Continued)

*Primary Examiner*—Chun Cao
*Assistant Examiner*—Malcolm D Cribbs
(74) *Attorney, Agent, or Firm*—Gordon E. Nelson

(57) ABSTRACT

Techniques for reconfiguring systems that are configured by modifying configuration tables in a database. Reconfiguration begins by making a copy of the production version to obtain the development version and a snapshot showing the current state of the configuration tables in the production version is made. The development version is then reconfigured and tested. Before the development version's configuration is migrated to the production version, the production version's configuration tables are compared with the snapshot to see whether the state of the production version's configuration tables has changed. If has not, the migration takes place; if it has, the production version's configuration tables have changed since the snapshot was made. In this case, a new development copy and snapshot must be made and the reconfiguration done over or if the user desires, a forced migration may be made by overwriting the production version's configuration tables with those of the development version.

25 Claims, 13 Drawing Sheets

U.S. PATENT DOCUMENTS

2004/0034716 A1* 2/2004 Sundarraj et al. ........... 709/242
2004/0083245 A1* 4/2004 Beeler, Jr. ................... 707/204
2004/0158612 A1* 8/2004 Concannon ................. 709/206
2006/0010367 A1* 1/2006 Sattler et al. ............... 715/503

OTHER PUBLICATIONS

Sparta Systems, Inc. "TrackWise User's Guide", 1995-2000, (p. 179).

* cited by examiner

301

1003

1005
1001

1007

METHOD FOR PRESERVING CHANGES MADE DURING A MIGRATION OF A SYSTEM'S CONFIGURATION TO A SECOND CONFIGURATION

CROSS REFERENCES TO RELATED APPLICATIONS

The present patent application claims priority from U.S. provisional patent application 60/427,319, Ran J. Flam and Alexander Koganov, Migrator Utility, filed Nov. 18, 2002. The entire provisional patent application is incorporated by reference herein. Also incorporated by reference herein for all purposes are U.S. Ser. No. 10/117,387, Ran J. Flam, Automated process control with user-configurable states that change upon completion of a user-configurable set of activities, filed Apr. 5, 2002, and U.S. Ser. No. 10/438,581, Ran J. Flam, et al., Techniques for providing audit trails of configuration changes, filed May 15, 2003.

BACKGROUND OF THE INVENTION

1. Field of the Invention

The invention relates generally to digital data processing systems whose behavior is for the most part determined by the contents of a database that is read or written by the system and more specifically to systems of this type which may be configured by modifying the contents of the database.

2. Description of Related Art

U.S. Ser. No. 10/117,387 discloses a highly-configurable system of the type just described which is used to control business processes such as handling orders or customer complaints. A system like that disclosed in U.S. Ser. No. 10/17387 may however be used for any kind of process control. FIG. 1 shows a schematic overview of such a system 101 as it has been modified to use the reconfiguration techniques that are the subject matter of the present invention.

System 101 is implemented using a standard computer 103 that is connected to a standard database system 125. The standard database system may be one such as those made by Oracle Corporation, of Redwood City, Calif. or Microsoft Corporation, of Redmond, Wash. Standard database system 125 includes tables, metadata 126 which are tables that define themselves and the other tables, and triggers 128. For purposes of the following discussion, a trigger is code which is associated with a table and is executed by system 101 in response to an event such as a modification of a record of the table. Standard computer 103 has a processor 105 which is connected to Internet 107 and to local peripheral devices 108 as well as to database system 125, which is implemented using non-volatile storage such as that provided by disk drives. Processor 105 has a memory 109 (understood to include both physical and virtual memory) which includes code executed by processor 109. Of interest to the present discussion is standard operating system code 111, Internet code 115, for performing functions such as email and interacting with Web pages according to the HTTP protocol, database code 113, which is part of and controls the operation of database system 125, and process control code 117, which is application code that implements the process control system. Also included in database system 125 are current schedule table 123 and current query and processing plans table 124 in memory 109. These tables contain information which database system 125 uses to accelerate making and executing queries. Process control code 117 includes two subdivisions: administrative module 119, which permits users of system 101 to configure and administer system 101, and exec module 121, which performs process control operations. Exec module 121 uses components of the operating system 111, Internet code 115, and DB code 113 to interact with Internet 107, local peripheral devices 108, and DB system 125. With regard to the interaction with DB system 125, process control code 117 issues queries to DB system 125 and receives the results of the queries from DB system 125. System 101 can run on a single computer 103, which functions as a server for the system, or alternatively it can run concurrently on a plurality of servers for load balancing purposes.

In broad terms, process control system 101 works by making a process record for each process that is being controlled in a PR table in tables 190 and using predefined queries to retrieve records that indicate conditions of the records' processes that require performance of some kind of activity. The predefined queries are either defined by system 101 or configured by the user. The user-configured queries are contained in tables in database system 125. The activity may either be performed by a user of system 101 using an interactive interface or automatically by system 101. The activities to be performed by system 101 are defined by tables in database system 125. For details, see U.S. Ser. No. 10/117,387. To give a concrete example of how system 101 works, one type of process that can be controlled by system 101 is a customer complaint. The exemplary process for dealing with a customer complaint is to assign it to a customer complaint specialist. The customer complaint specialist is to investigate the complaint and reply to the customer within a set time period. If the reply is not timely, the complaint is escalated to the customer complaint specialist's supervisor, again with a time limit for the supervisor to deal with the problem. The activity that corresponds to the escalation is the dispatch of an email message to the supervisor. In system 101, when the complaint arrives, a process record for the complaint is made in a process record table in tables 190. When the complaint specialist replies to the customer, the specialist alters the process record to indicate that the complaint specialist has replied and the time of the reply. System 101 periodically runs a query which queries the process record table for process records that indicate that the complaint specialist has not timely replied. The query further specifies that when the complaint specialist has not timely replied, the activity to be performed is to escalate the complaint by sending email to the supervisor. When system 101 finds such a record in the process record table, it performs the specified activity, as defined by data values in the process record and activity definitions in state machine tables 158.

A particularly important aspect of system 101 for the present discussion is that system 101 is highly configurable. Configuration is done by setting values in records of configuration tables 129. The tables in configuration tables 129 fall into four groups: state machine tables, which define what activities system 101 performs and how the performance of the activity affects the state of system 101, permission tables, which define the permissions held by various users of system 101, notification tables, which define who is to be notified and how when an activity is performed, login tables, which define how users must login, and name definition tables, which define the names used for entities in system 101. Configuration change tracking tables 188 are tables which track changes made in configuration tables 129. An example of how configuration tables 129 are used in system 101 is the following: each process monitored by the system belongs to a project and the project is defined in a project table in configuration tables 129. Changes made to the project table may be tracked in configuration change tracking tables 188. The use of configuration tables 129 to configure system 101 also limits the system's configurability so that it can be safely done by non-technical users of system 101. All of the tools provided by DB system 125 for configuring records in its tables are available to configure the records in the tables of system 125, as are the user interfaces which DB system 125 provides for those tools.

A problem with any highly-configurable system is system availability while the configuration of the system is being changed. In the case of systems like system 101, where configuration is done by changing tables in DB system 125, DB system 125 provides locking mechanisms which bar access to a table while changes are being made in it. The difficulty with such an arrangement in a system like system 101 is that the system will not operate if access to the tables that configure it is barred. System 101 thus becomes inoperable during the often considerable amount of time required to reconfigure system 101.

A way of keeping system 101 going while reconfiguring it is to make a copy of system 101's current database, do the configuration changes on the copy, test the changes on the copy, and then replace the configuration tables from the current database with the configuration tables from the copy. The problem with this approach is that any configuration changes made in system 101 between the time the copy is made and the time the configuration tables from the copy replace the current configuration tables are lost. To be sure, users of system 101 can be told to make no configuration changes after the copy has been made, but there is no way of knowing whether such changes have been made in fact, and if they have been made, they will be lost. This in turn may lead to unexpected behavior in system 101. In a process control system like system 101 such unexpected behavior obviously cannot be tolerated. It is thus an object of the present invention to permit the use of a copy of system 101's current database for making configuration changes while providing certainty that changes made to the configuration of the current database during the process of making configuration changes will not be lost.

SUMMARY OF THE INVENTION

The object of the invention is achieved by a method of migrating from an original configuration defined by first configuration tables to a new configuration defined by second configuration tables. In the method, the second configuration tables are made, the first configuration tables are checked to make sure that they still define the original configuration, and if they do, the second configuration tables are used to update the first configuration tables so that they define the new configuration. The method thus assures that changes made in the first configuration tables while the second configuration tables are being made will not be lost.

Continuing in more detail, the method further includes making a snapshot of the first configuration tables prior to making the second configuration tables and using the snapshot to determine whether the first configuration tables still define the original configuration. Further, the second configuration tables are made by copying the first configuration tables and modifying the copy. Additionally, the configuration defined by the second configuration tables may be tested before the second configuration tables are used to update the first configuration tables. Also included in the method are the steps of having users log off before the first configuration tables are copied and before the first configuration tables are checked to make sure that they still define the original configuration and having a preselected set of users sign off on the changes before the first configuration tables are checked to make sure that they still define the original configuration. If the first configuration tables no longer define the original configuration, the user doing the migration may choose to overwrite the first configuration tables with the second configuration tables.

An implementation of the method in a system that includes a processor and a database includes a copy of the first configuration tables and a snapshot table which can be used by the processor to determine whether the first configuration tables still define the first configuration. A signoff table may also be included. The signoff table has an entry for each user who must sign off on the new configuration.

Other objects and advantages will be apparent to those skilled in the arts to which the invention pertains upon perusal of the following Detailed Description and drawing, wherein:

Figure 1:
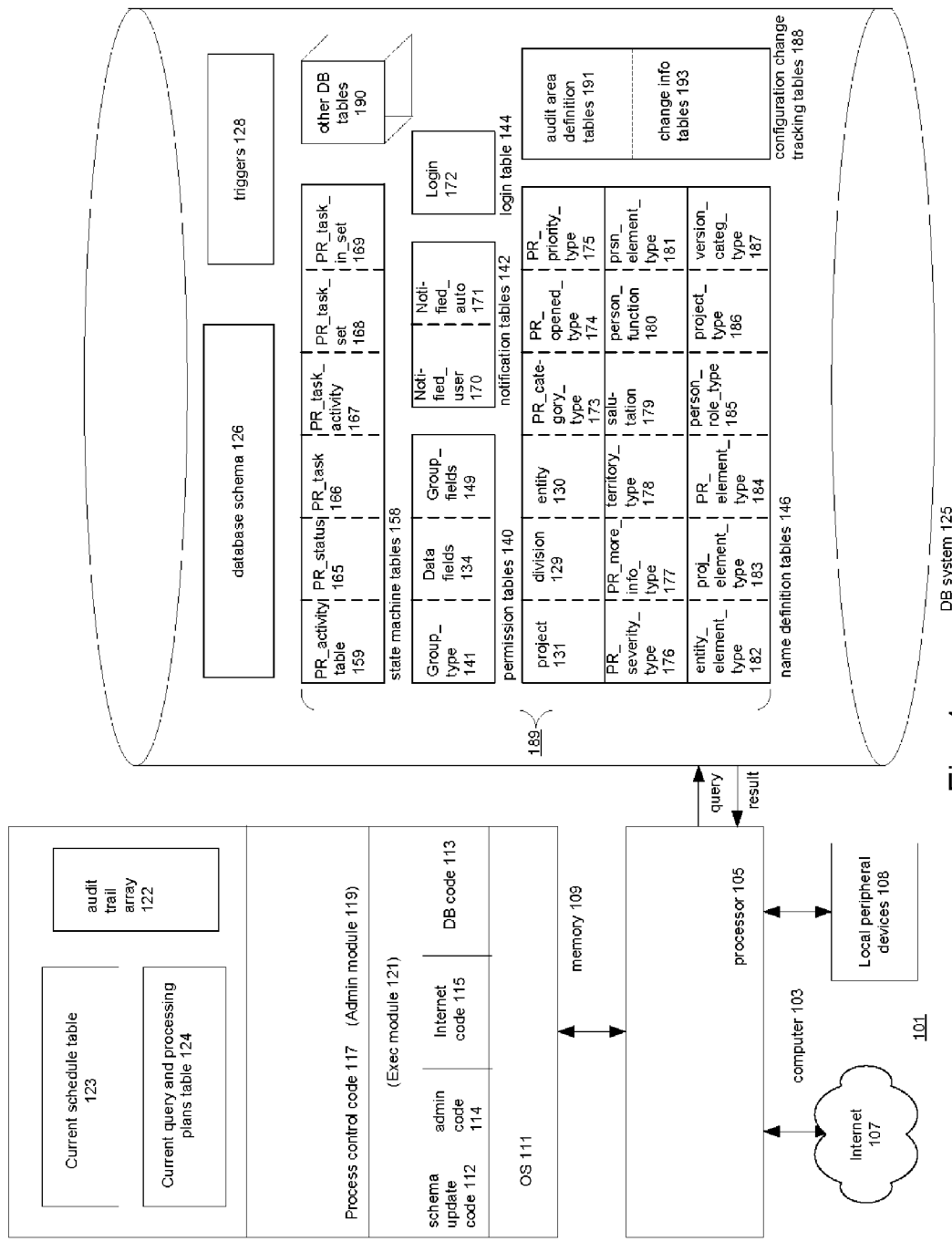
FIG. 1 is a configurable process control system in which the techniques for reconfiguring have been implemented.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first provide an overview of the reconfiguration techniques and will then provide a detailed description of the implementation of the techniques in process control system 101.

Overview of the techniques

General Overview

At the most basic level, the reconfiguration techniques are techniques for ensuring that when a reconfiguration operation a is performed on configuration m of configurable system 101 beginning at a time x and completed at time y, the only configuration changes made to configuration m between the time x and the time y are those specified by operation a. To achieve this end, operation a is performed as follows:

- database 135 whose configuration tables specify configuration m is copied to a development database 137.
- At time x, the configuration of database 135 is compared with that of database 137.
- If they are identical, a snapshot is immediately made of configuration m's configuration tables 129(*a*). The snapshot makes it possible to determine whether the configuration m of database 135 has changed since time x.
- Configuration tables 129(*b*) in development database 137 are then modified as required to produce configuration m+1.
- When modification of configuration tables 129(*b*) is complete, the snapshot is compared with the configuration tables of database 135 to determine whether database 135 still has configuration m. If the comparison verifies that database 135 still has configuration m, the configuration changes in configuration tables 129(*b*) are copied to production DB 135, giving that database configuration m+1. If the comparison fails, operation a must be repeated.

Overview of Process Control System 101 as Modified for the Techniques: FIG. 1

To perform reconfiguration operation a, migrator tables 132(*a*) have been added to production database 135. The tables include config_tables 131 and Migrator_signoff table 130. config_tables 131 contains a record for every table in configuration tables 129(*a*). The record includes the table's name and the date time at which the config_tables record itself was updated. Migrator_signoff table 130 contains a record for each user of system 101 who must sign off before system 101 is changed from configuration m to configuration m+1. The record contains information by which the user may be identified. When production database 135 is copied to produce development database 137, config_tables 131(*a*) and Migrator_signoff table 131 are copied as well to produce the corresponding tables 131(*b*) and 130(*b*). Development database 137 further includes Config_snapshot table 133, which has a record for every table in configuration tables 129(*a*). The record records for each table the table's name, the last date and time at which the table was updated, and the record count as of the last update.

Figure 2:
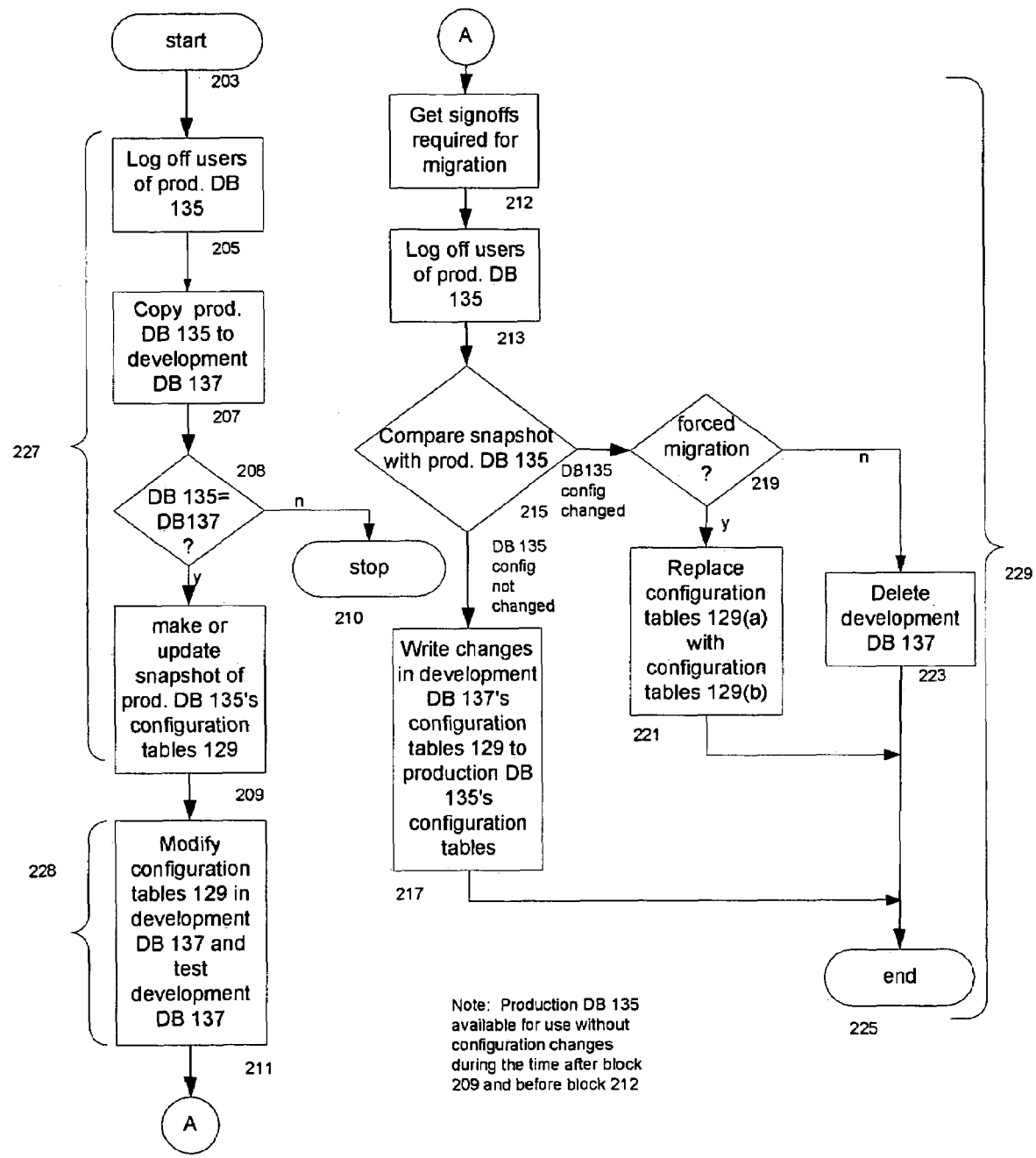
FIG. 2 is a flowchart of a method of reconfiguring the system of FIG. 1.

Overview of Configuration Change in Process Control System 101: FIG. 2

FIG. 2 is a flowchart 201 of how configuration changes are made in system 101 as modified for the reconfiguration techniques of the invention. There are three stages in making a configuration change: establishing a reference configuration m, identified by bracket 227 in FIG. 2, creating new configuration m+1, identified by bracket 228, and migrating new configuration m+1 to a database having reference configuration m. Starting at 203, the first step in establishing the reference configuration m is to get all users of production database 135 logged off of system 101 except for the user who is going to copy the production database to the development database (205). Then production database 135 is copied to development database 137. Next, database 135 and database 137 are compared (208). If they are identical, Config_snapshot table 133 is made (209) to preserve reference configuration m, identified by bracket 229. Otherwise, database 135 must be recopied to database 137 (210). Config_snapshot table 133 is made by working through Config_tables table 131(*a*). For each record there, an record in Config_snapshot table 133 is made, with the table name coming from the record in Config_tables 131(*a*) and the last date at which the table was updated and the record count as of the last update from the definition of the table in metadata 126(*a*).

Once all this is done, stage 228, creating a new configuration m+1 is entered. In this stage, the configuration tables 129(*b*) in development DB 137 are modified as required for the new configuration and the new configuration is tested (211).

Migration stage 229 begins at step 212. At this point all signoffs required for the migration must be obtained. This is done using sign off table 130(*b*), which, as described above, contains a record identifying each user whose signoff is necessary. Thereupon, all users other than the user performing the migration must log off (213). When all signoffs have been obtained and all users have logged off, the migration itself may begin. First, the snapshot in snapshot table 133 is compared with configuration tables 129(*a*) (215). If all of the configuration tables still have the same last date and time at which the table was updated and the same record count as indicated in snapshot table 133, production database 135 still has configuration m and the migration to configuration m+1 specified in configuration tables 129(*b*) can take place. The migration is done on a record-by-record basis (217): for each table in configuration tables 129(*a*), records that are present in the table in configuration tables 129(*a*) but are not present in the table in configuration tables 129(*b*) are removed, records that have been updated in configuration tables 129(*b*) are updated in the same way in configuration tables 129(*a*), and records that are present in configuration tables 129(*b*) but not in tables 129(*a*) are added to the tables in configuration tables 129(*a*). Thus, at the end of the process, configuration tables 129(*a*) are identical to configuration tables 129(*b*).

If the snapshot in Config_snapshot table 133 does not match configuration tables 129(*a*), the user doing the migration has two choices:

- The user can do a forced migration, in which configuration tables 129(*a*) are simply overwritten with configuration tables 129(*b*), causing the loss of any changes to tables 129(*a*) that were made after Config_snapshot table 133 was made (221) and configuration m thereby established as a reference configuration; or
- If the user does not do the forced migration, development DB 137 will be deleted and the user must begin the configuration change process again at stage 227 (223).

As can be seen from the foregoing, the method of flowchart 210 enforces two disciplines on the managers of system 101:

- if configuration tables 129(*a*) having configuration m are to be modified to conform to configuration tables 129(*b*) having configuration m+1, no changes in configuration tables 129(*a*) may be made between the time snapshot table 133 has been made and the time the changes in tables 129(*b*) are written to tables 129(*a*); and configuration tables 129(a) cannot be modified to conform to configuration tables 129(b) without signoffs from the system users identified in Migrator_signoff table 130.

Details of a Presently-Preferred Embodiment

In a preferred embodiment of system 101, users of the system interact with system 101 by means of personal computers or workstations that communicate with system 101 via Internet 107. The user interface for the system is Web pages that processor 105 provides to users via Internet 107 in response to inputs from the users that specify the Web page. In the following, details of the configuration change techniques will be disclosed as seen from the point of view of a user of system 101.

Figure 3:
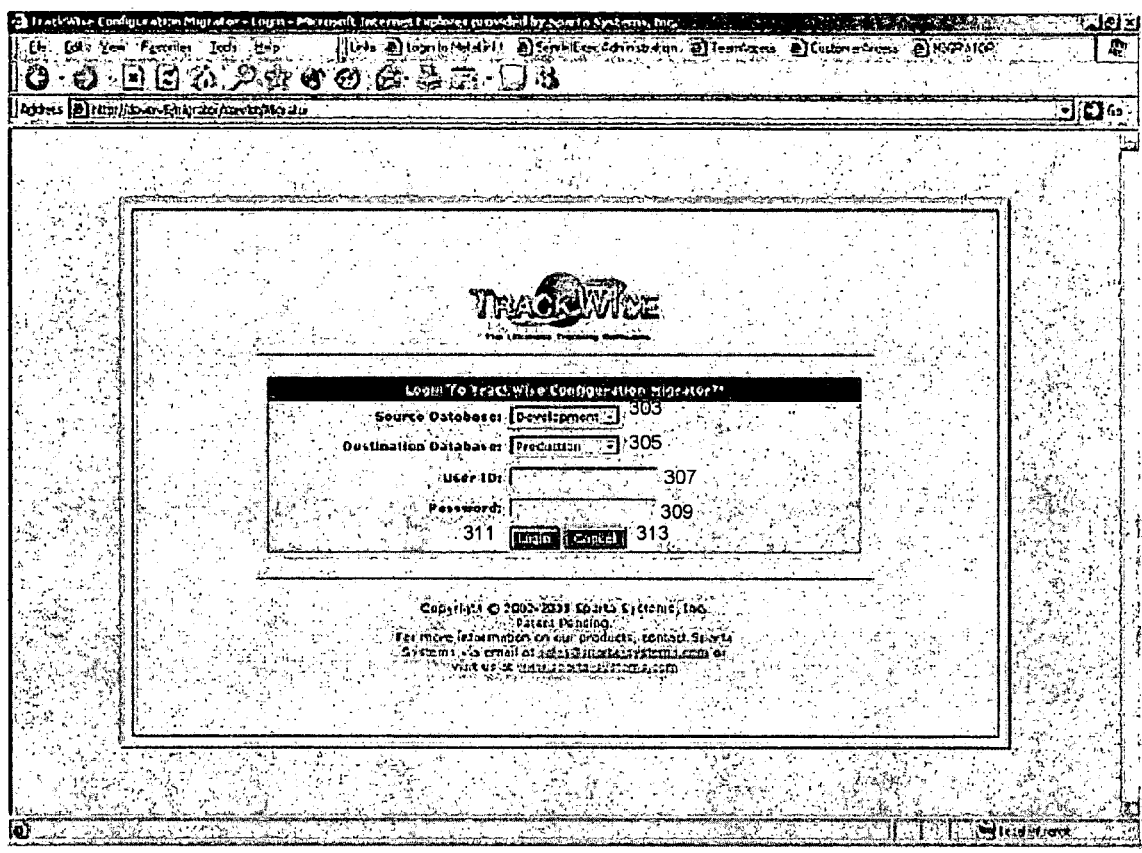
FIG. 3 shows the logon Web page for the Trackwise Configuration Migrator utility.

Logging onto the Trackwise Configuration Migrator: FIG. 3

The utility which employs the principles of the invention in system 101 is termed the Trackwise Configuration Migrator™. The code for the Trackwise Configuration Migrator is shown at 120. FIG. 3 shows the login Web page 301 for the Trackwise Configuration Migrator. At 303 and 305 are drop-down lists of databases available in system 101 from which the user may select a source database, which will be the source of the configuration changes, and a destination database, to which the configuration changes will be copied. In terms of the discussion of the overview, the source database is development database 137 and the destination database is production database 135. Fields 307 and 309 permit the user who is doing the configuration change to log in. When the user has selected the proper source and destination databases and entered his or her user ID and password, the user may press login button 311 to begin the login process. The user may press cancel button 313 at any point to exit the Trackwise Configuration Migrator.

Figure 4:
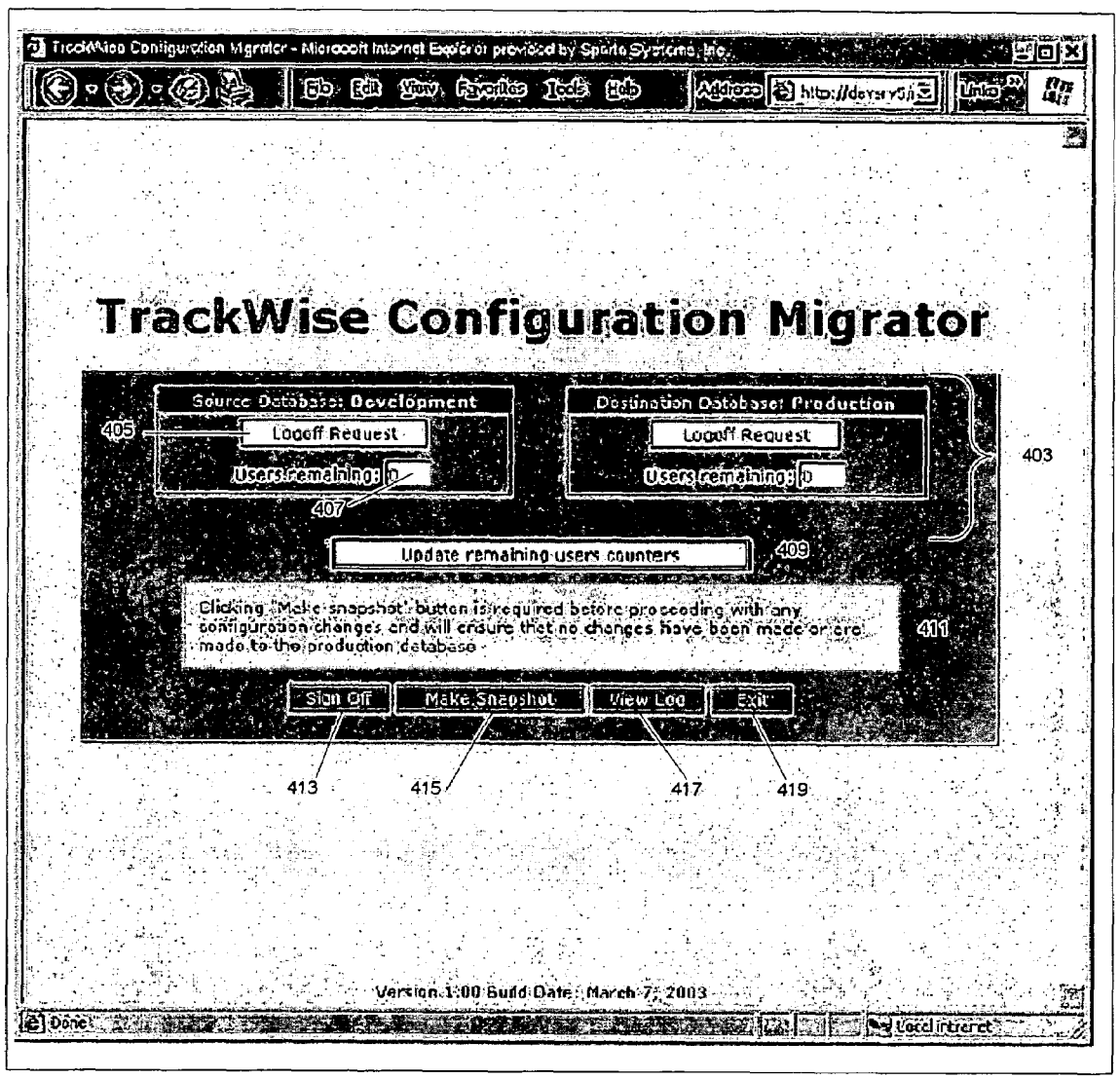
FIG. 4 shows the main Web page for the Trackwise Configuration Migrator utility.

The Trackwise Configuration Migrator Main Page: FIG. 4

If log in is successful, the Web page of FIG. 4 appears. Main Migrator Web page 401 is used to control operation of the Trackwise Configuration Migrator. The web page has two parts: logoff buttons and status fields 403 and operation buttons 413-419. Logoff buttons and status fields 403 ensure that all users of both the source and destination databases are logged off before the destination DB is copied to the source DB and the snapshot is made of the destination database's configuration in stage 227. They also ensure that all users are logged off in stage 229 before the configuration changes of the source database are applied to the destination database. Operation buttons 413-419 indicate the operations that are available to the user in the current stage of the migration operation. Field 411 contains prompts that are appropriate to the stage of the migration operation.

Continuing in more detail, there is a logoff request button 405 and a users remaining status field 407 for the source database and the destination database that was selected by the user at login. When logoff request button 405 is clicked on, messages are sent to all current users of the database in question asking them to log off. Users remaining status field 407 indicates the number of users still logged on. The current values of these fields can be obtained by pressing button 409. The user receives a warning message if he or she attempts to continue stage 227 or 229 before all of the users are logged off. Operation buttons 413-419 indicate the operations that are possible at this stage, which is after the destination database has been copied to the source database but before a snapshot has been made.

Figure 13:
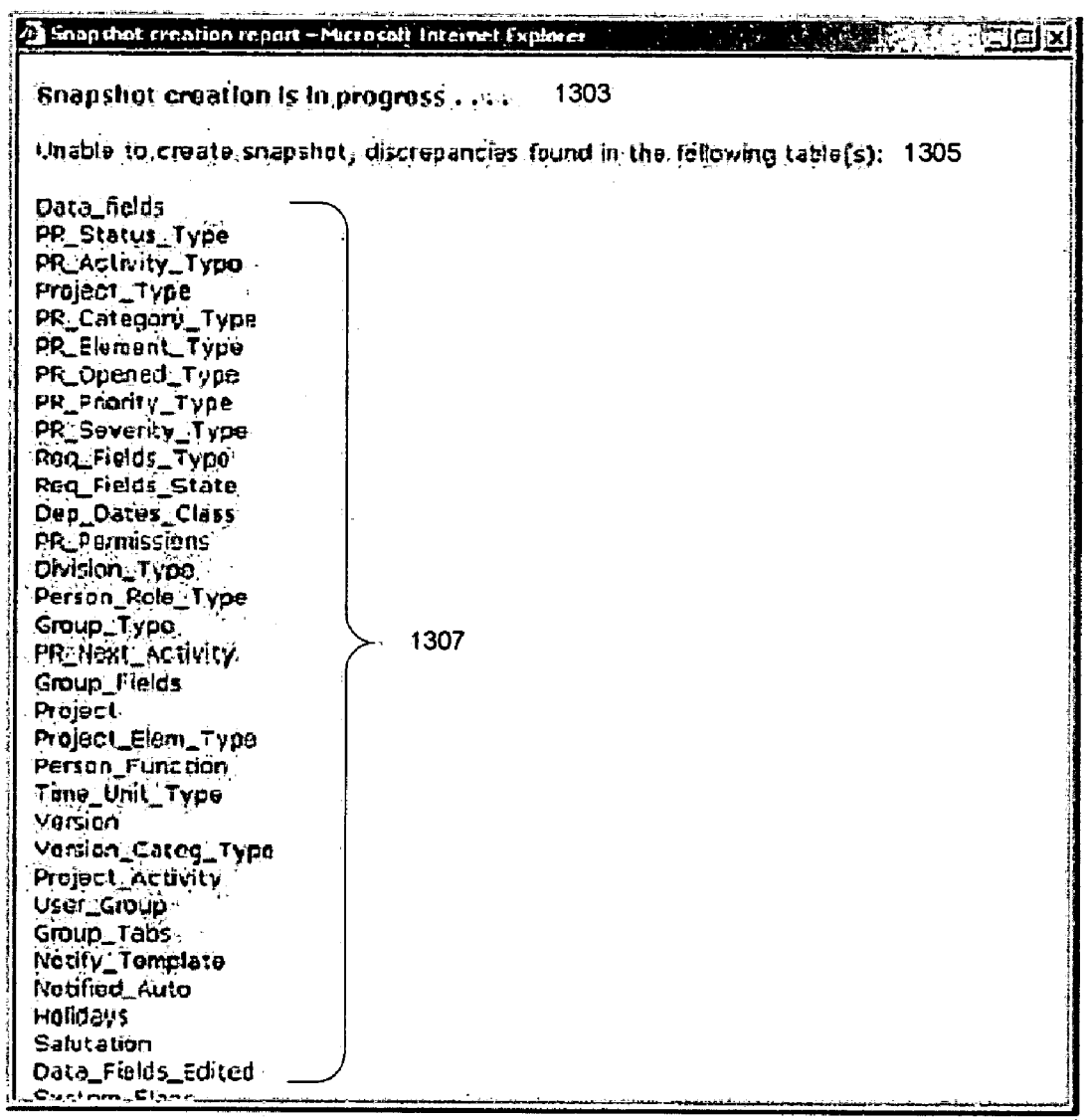
FIG. 13 shows the Web page that appears when the source and destination databases do not have identical configuration table when the snapshot is made.

As the message at 411 indicates, the only operations that are possible at this point are exit (button 419), view log (button 417), make snapshot (button 417), and signoff 413. exit and view log are self-explanatory; when the user clicks on make snapshot, processor 105 executing Trackwise Configuration Migrator code 120 compares the source table and the destination table; if discrepancies are found, the Web page 1301 shown in FIG. 13 appears. Page 1301 indicates at 1303 that the snapshot creation operation is in progress and at 1305 that the comparison between the configuration tables 129 in the source and destination databases has found discrepancies. The individual tables in configuration tables 129 in which discrepancies were found are listed at 1307. If there are no discrepancies processor 105 creates or updates Config_snapshot table 133 and when this is done, changes the label on button 415 to read start, as shown at 805 in FIG. 8. Clicking on start button 805 at any time after the creation of config_snapshot table 133 will start the actual migration operation. Generally, of course, the user will exit the Trackwise Configuration Migrator, modify the configuration of the source data base and test the modified configuration, and then again log onto the Trackwise Configuration Migrator as already described to do the migration.

Figure 5:
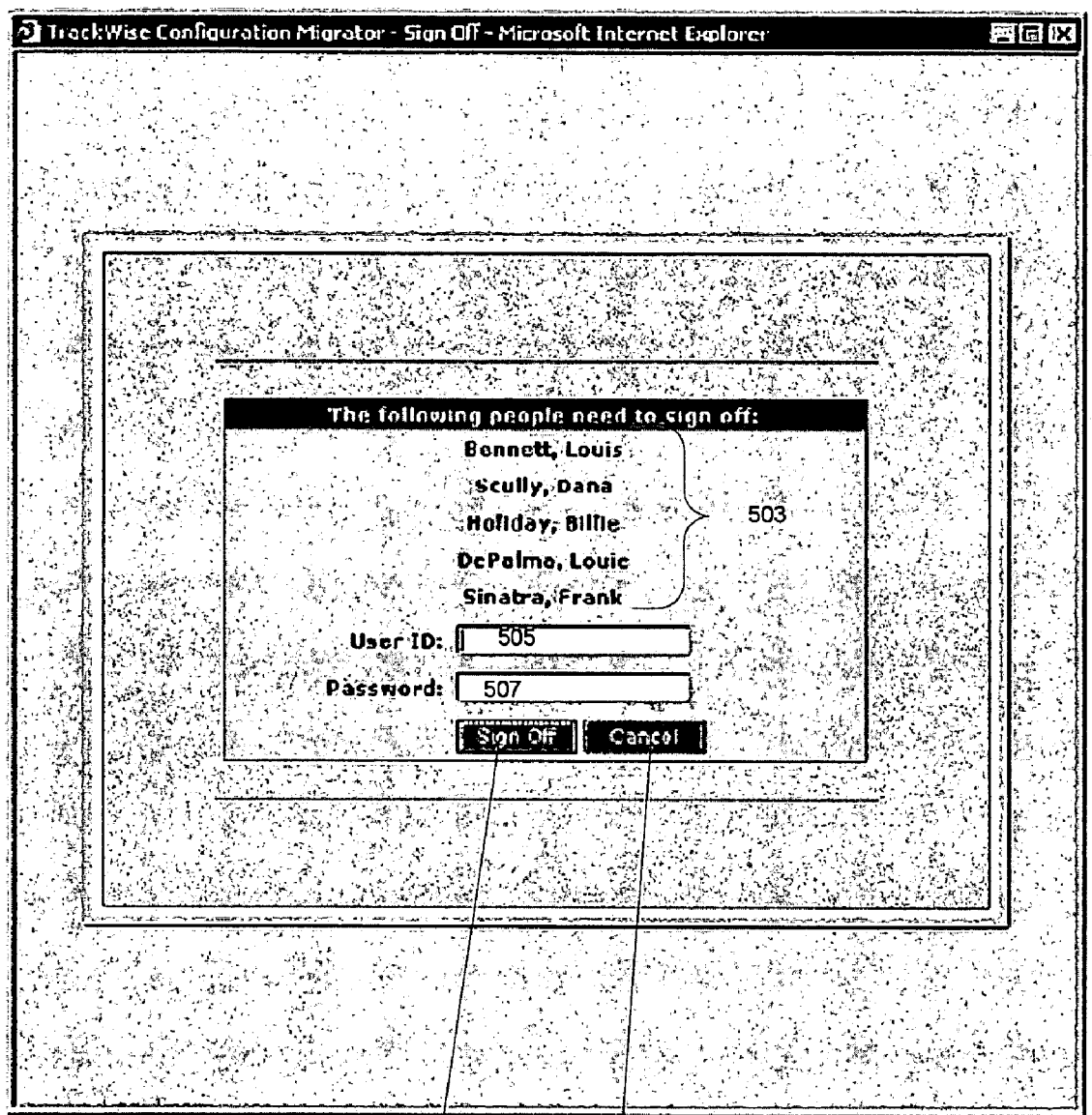
FIG. 5 shows the Web page for collecting signoffs for the configuration change.
Figure 6:
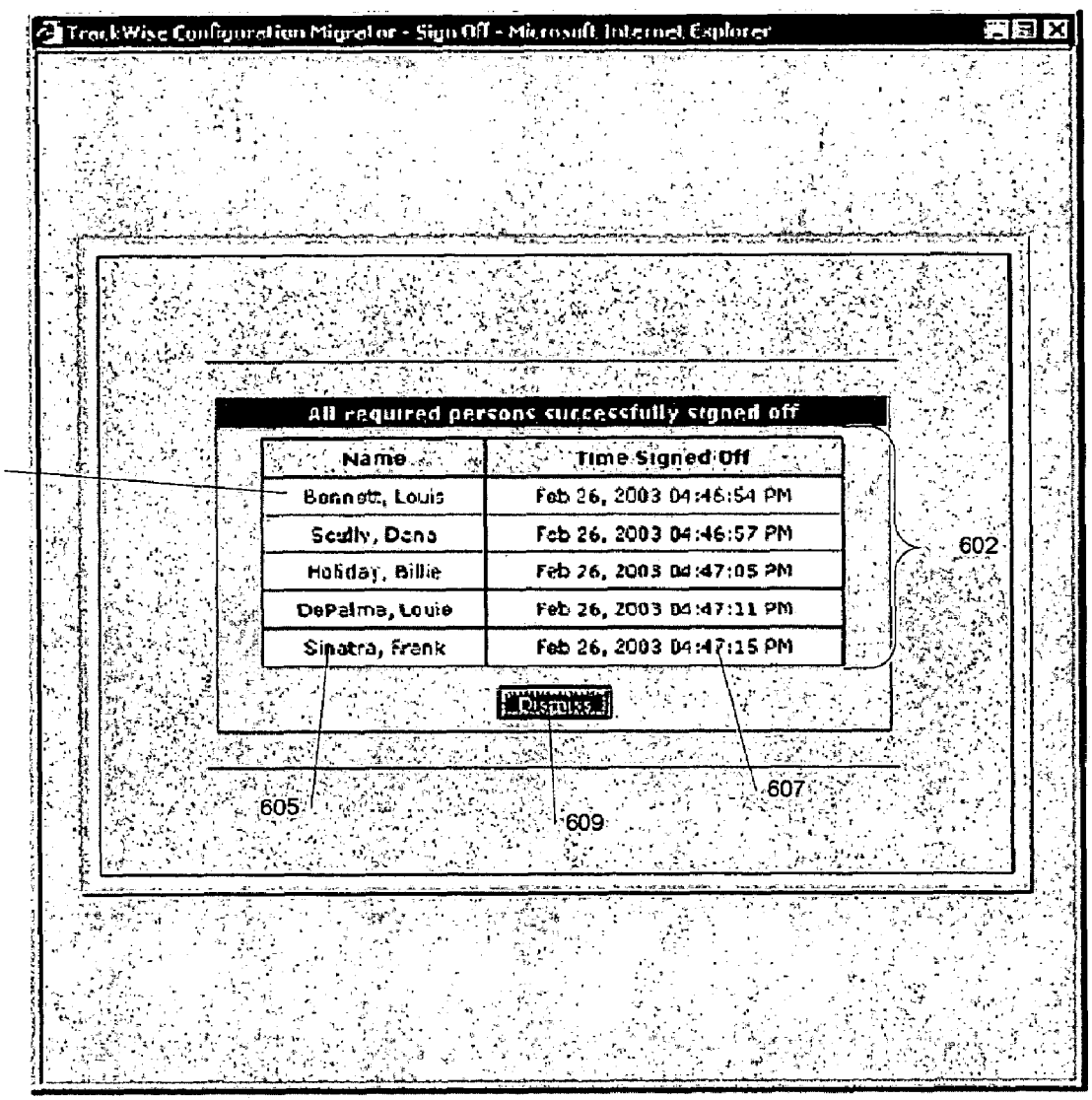
FIG. 6 shows the Web page that appears when all signoffs have been collected.
Figure 7:
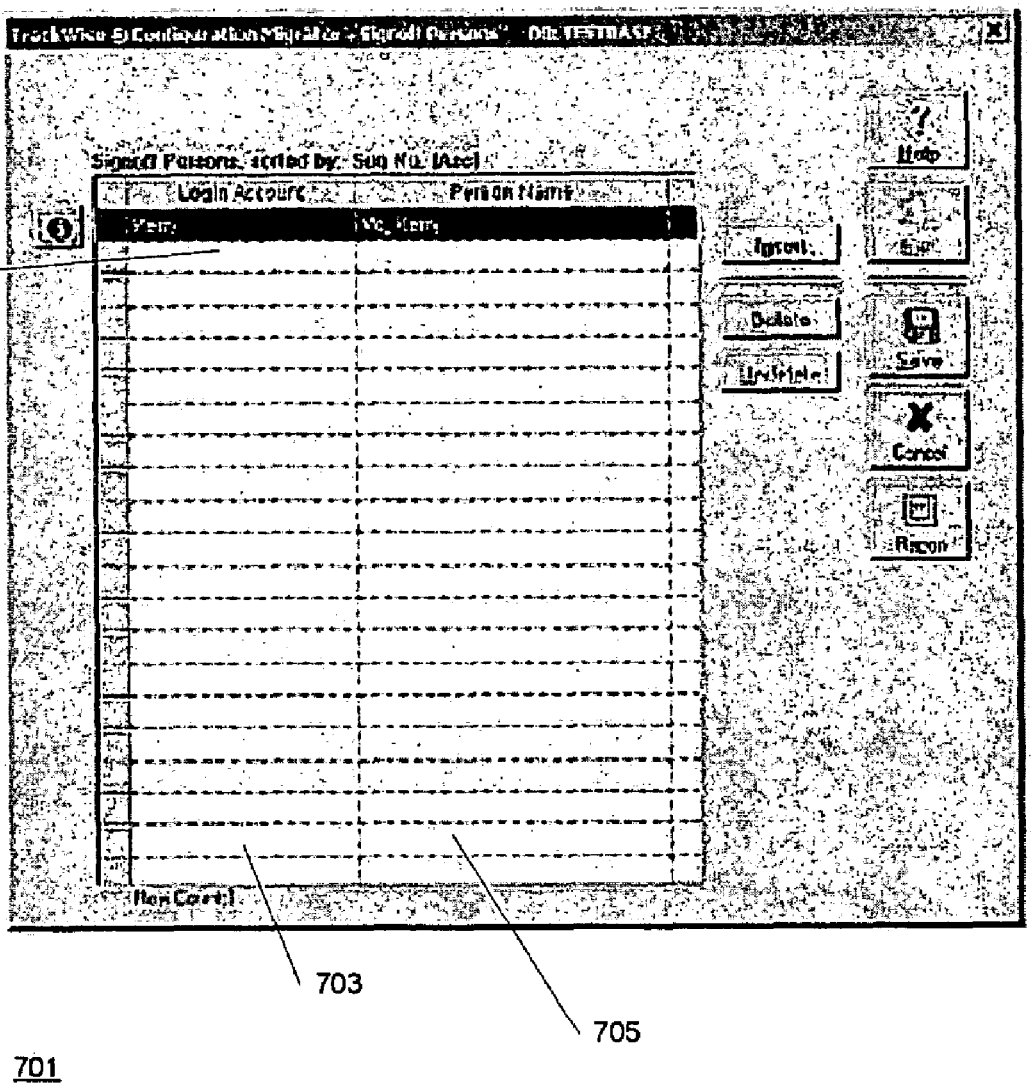
FIG. 7 shows the Web page for constructing Migrator_ signoff table 130.

As indicated at block 213 of flowchart 201 in FIG. 2, signoffs by particular users of system 101 may be required before the configuration in the source database is applied to the destination database. To cause processor 105 to execute the part of Trackwise Configuration Migrator code 120 which collects signatures, the user doing the migration clicks on signoff button 413 on main Web page 401; if no signoffs are required, signoff button 413 does not appear on Web page 401. When the user clicks on signoff button 413, Web page 501, shown in FIG. 5, appears. This page has a list 503 of all of the users that are specified in Migrator_signoff table 130; each of these users must input his or her user ID and password to fields 505 and 507 and click on signoff button 509. To cancel the current signoff operation, the user clicks on cancel button 511. When all of the users specified in Migrator_signoff table 130 have signed off as just described, Web page 601, shown in FIG. 6, appears. Page 601 has a list 602 of the users who have signed off. There is a record 603 for each user and each record contains the user's name 605 and the time he or she signed off 607. To proceed with the reconfiguration of the destination database, the user clicks on dismiss button 609. FIG. 7 shows Web page 701 that is used to add users to or remove users from Migrator_signoff table 130. This page is provided by the execution of code in admin module 119 other than Trackwise Configuration Migrator code 120. The page has a table in which each record 707 has two columns: one (703) for a user's login and another (705) for the user's name. To save the modifications in table 130, the user clicks on save button 709.

Figure 8:
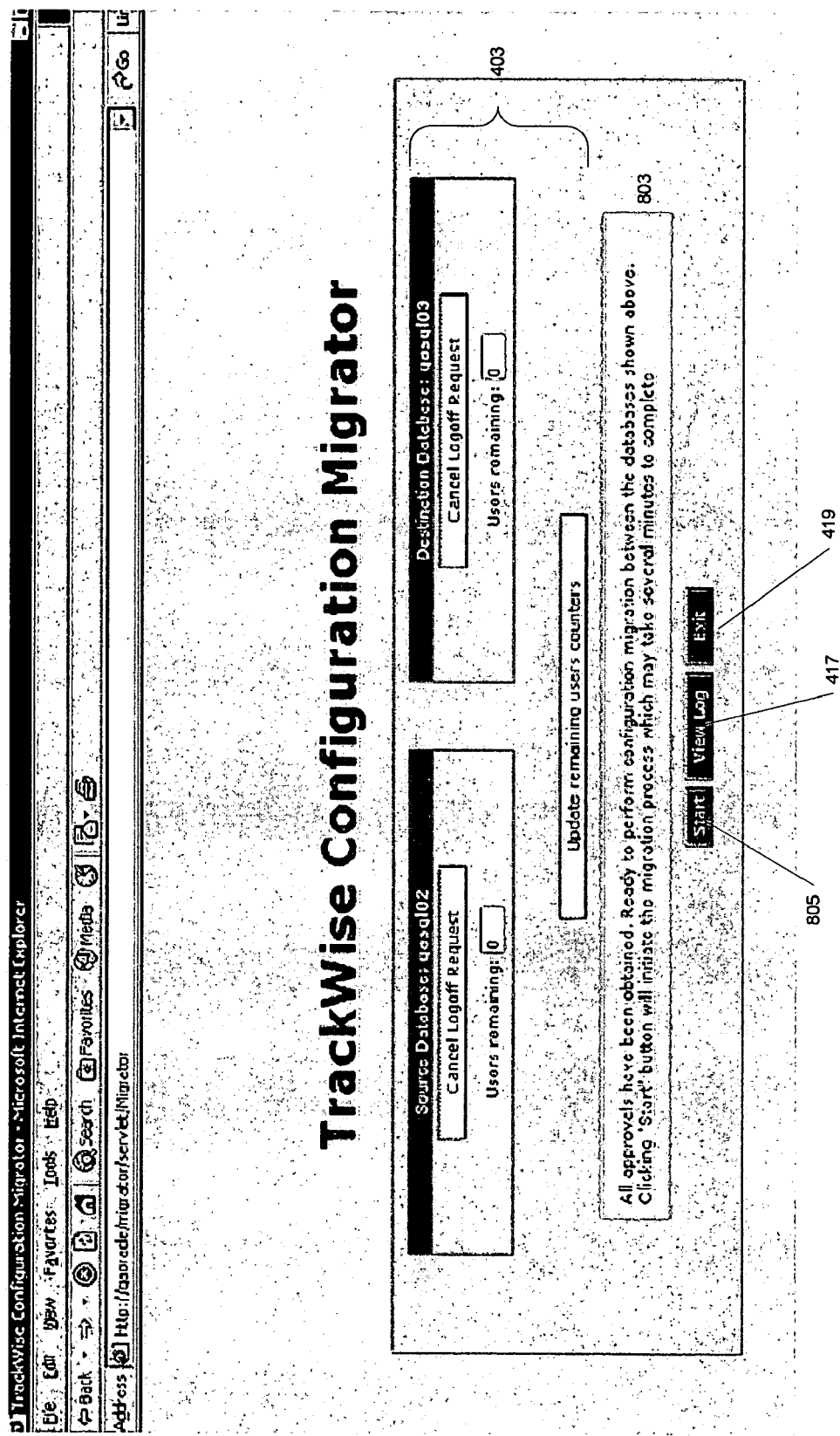
FIG. 8 shows the main Web page as it appears just before the configuration change is made.

When the user clicks on dismiss button 609, the version of the main control screen shown at 801 in FIG. 8 appears. As before, there is a logoff control portion 403 and a set of operation buttons 805, 417, and 419. Since the signoff has been completed, there is no signoff button 413. Once all users have logged off, pressing start button 805 will start the process shown at 229 of FIG. 2. First, Trackwise Configuration Migrator code 120 executing on processor 105 confirms that source database 137 includes a Config_snapshot table 133.

If it does, the configuration snapshot stored in Config_snapshot table 133 is compared with the current configuration of the destination database. If they are identical, the Web page shown at 1007 in FIG. 10 appears. The page informs the user that the migration cannot be undone and permits the user to indicate whether he or she wishes to continue. If the user elects to continue, the changes in source DB 137's configuration tables 129(b) are written to destination DB 135's configuration tables 129(a) and main Web page 413 reappears.

Figure 9:
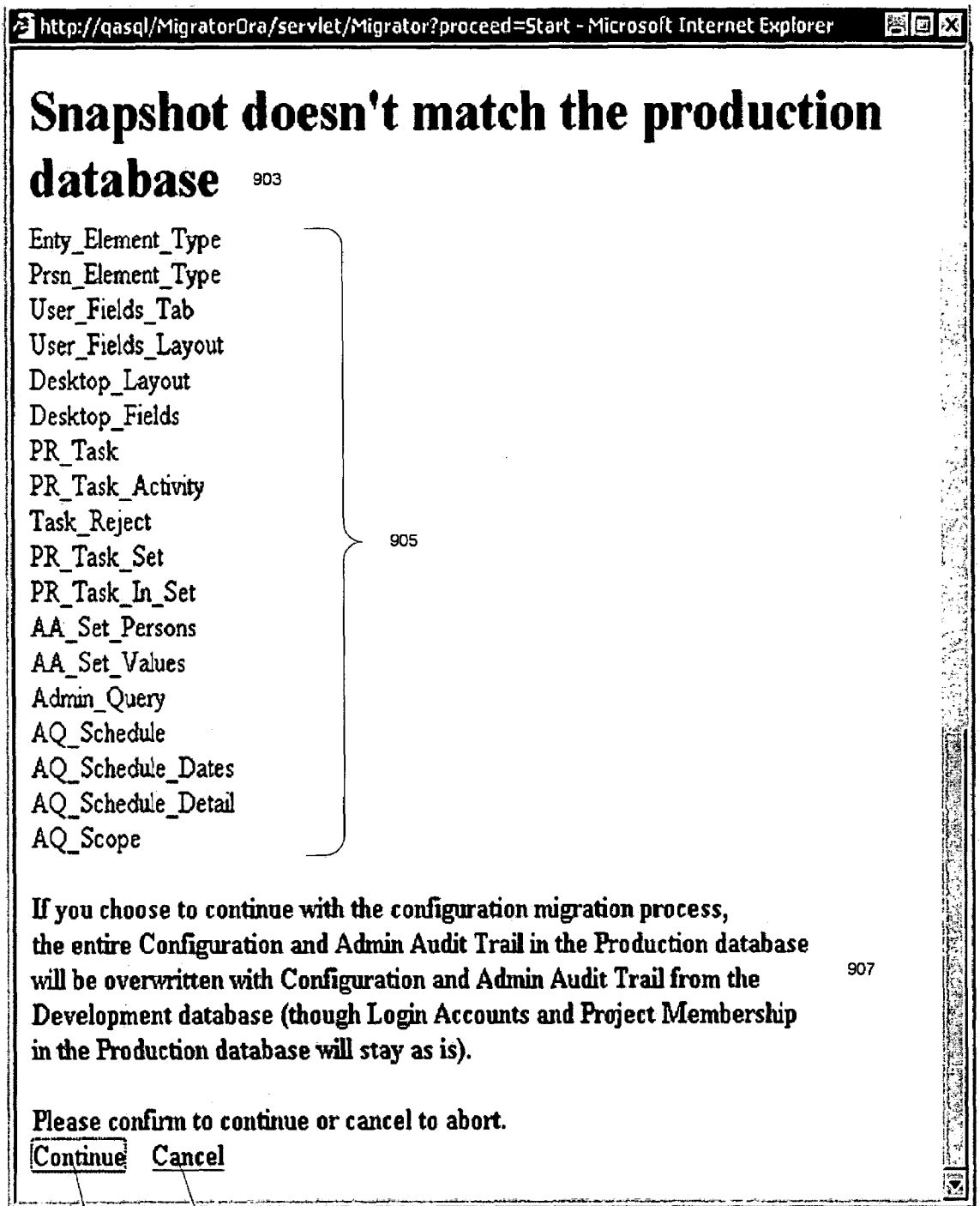
FIG. 9 shows the message that appears if the snapshot doesn't match the destination database at the time the configuration change is to be made.
Figure 10:
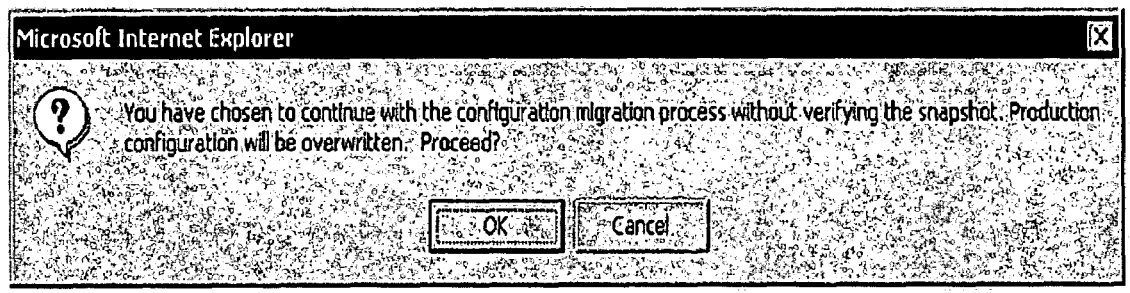
FIG. 10 shows messages indicating further procedures if the snapshot doesn't match the destination database.
Figure 10:
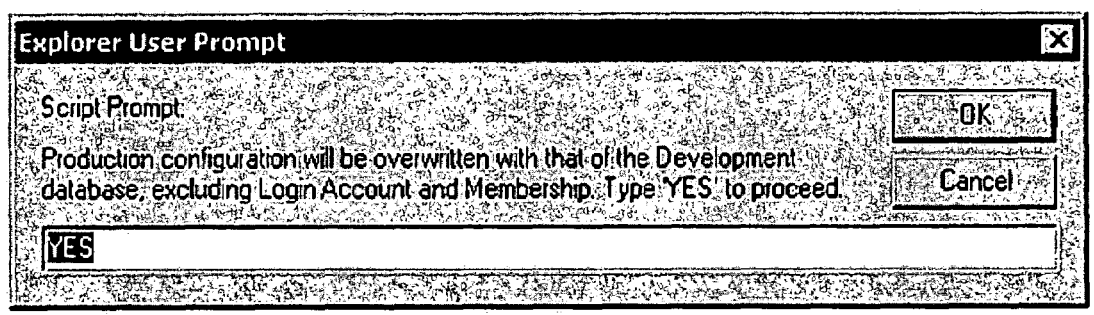
Figure 10:
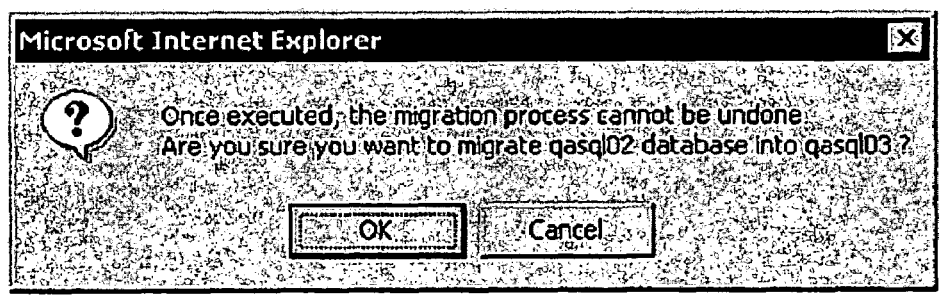

If the configuration snapshot is not identical with the current configuration of destination DB 135 or if there is no Config_snapshot table 133, Web page 901 shown in FIG. 9 appears. Message 903 indicates the problem, list 905 shows the configuration tables in the destination database which did not match the snapshot, message 907 indicates that the configuration changes made in the destination database after the snapshot was made will be lost, and buttons 909 and 911 permit the user to indicate whether he or she wishes to proceed with a forced migration. On clicking on button 909, screen sequence 1001 appears (FIG. 10). Screen 1003 appears first and asks the user to confirm that he or she wants to continue even though the snapshot configuration didn't match the destination database's configuration. If the user indicates that he or she still wants to continue, screen 1005 then appears, which asks the user to input "YES" if he or she wishes to continue and explains the consequences of continuing. If the user inputs "YES", Trackwise Configuration Migrator code 120 causes processor 105 to perform the forced migration operation, in which the configuration tables of the destination database are simply overwritten with the configuration tables of the source database. When this operation is finished, main page 413 appears.

Figure 11:
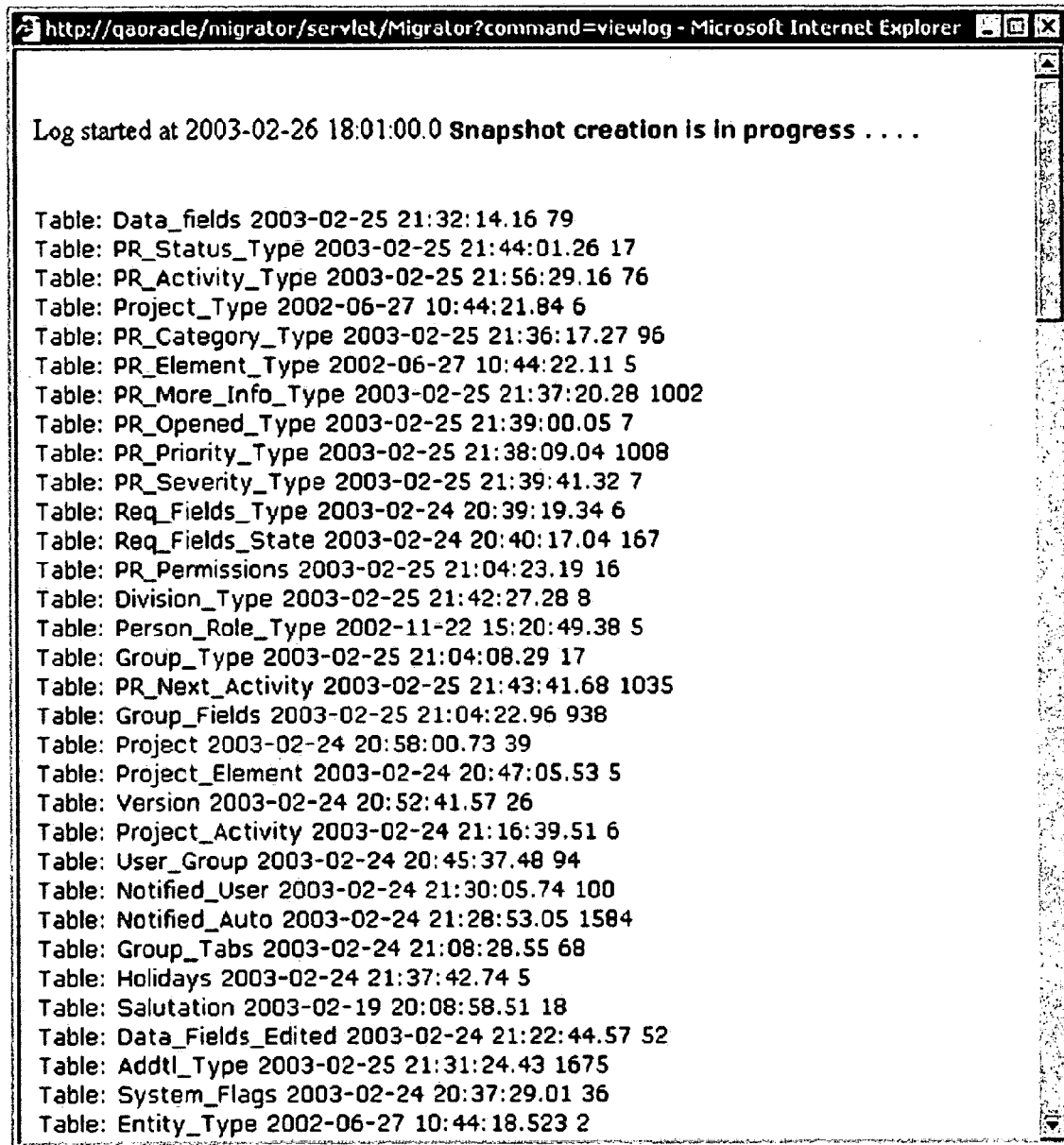
FIG. 11 shows a log made during snapshot creation.
Figure 12:
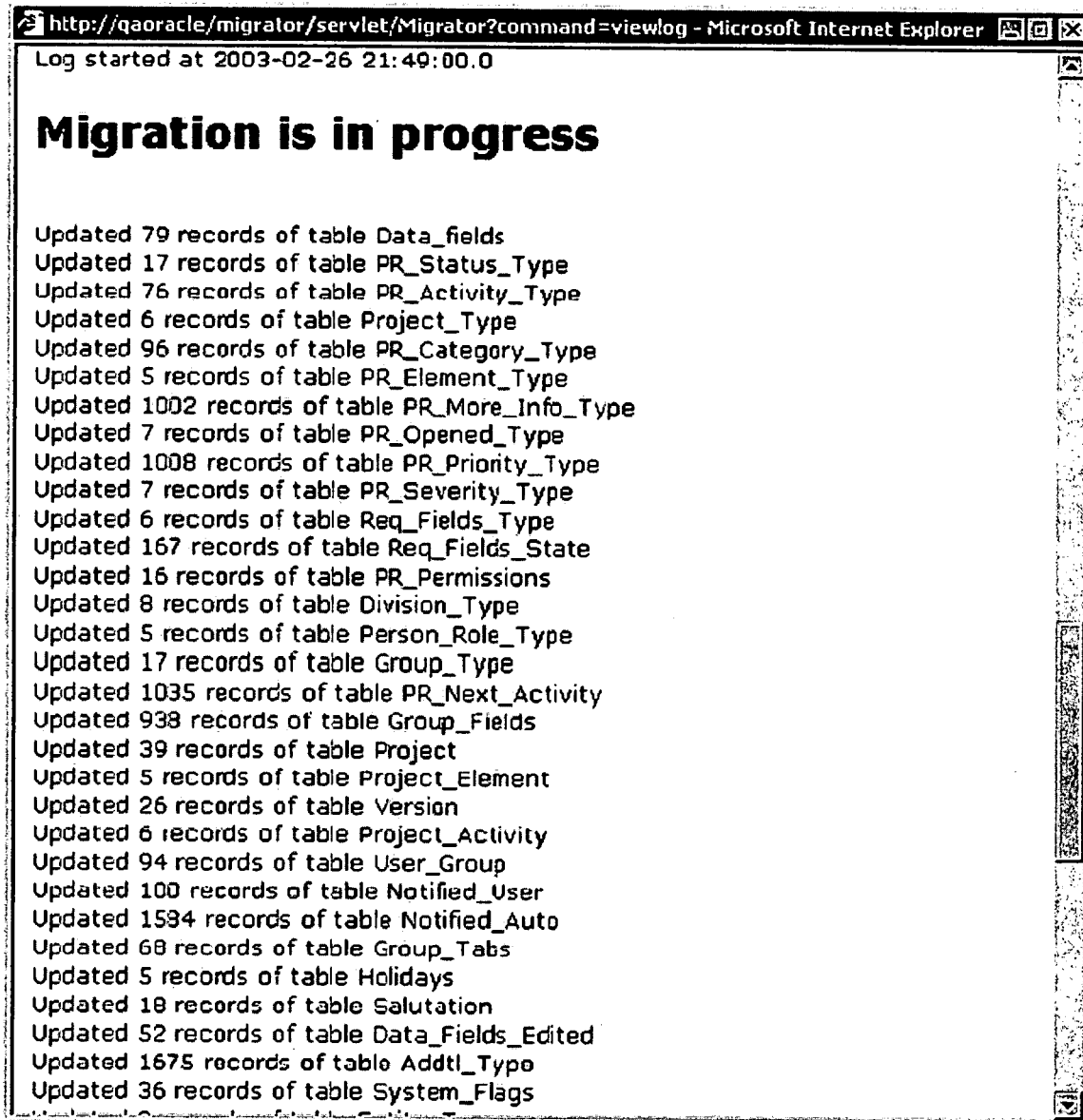
FIG. 12 shows a log made while the configuration changes are being propagated to the destination database.

FIGS. 11 and 12 show two examples of what a user sees when the user clicks on log button 417. FIG. 11 shows the log output during the operation of snapshot creation. As each configuration table's snapshot is made, the table is listed in the Web page of FIG. 11. FIG. 12 shows the log output during the migration operation. Here, the changes made in each configuration table in the destination database are listed.

Details of migrator tables 132

Config table 131

Records in Config_tables 131 are defined as follows in a preferred embodiment:

```
MS SQL Server definition:
CREATE TABLE
    Config_Tables(
        id       INT NOT NULL,
        name     VARCHAR(20),
        type     INT,
        date_updated DATETIME NOT NULL
    )
Oracle definition:
CREATE TABLE
    Config_Tables(
        id       NUMBER(12) NOT NULL,
        name     VARCHAR2(20),
        type     NUMBER(12),
        date_updated DATE NOT NULL
    )
```

The columns of the table are: id, name, type and date_updated. Each record represents a table that contains admin information and needs to be migrated. The "id" column is a record identifier. The "name" is a name of the corresponding table. The "type" column indicates whether the particular table is used by the Trackwise Configuration Migrator utility or the Admin Audit Trail utility. "date_updated" is the date/time when the record was modified.

The application performs the importation process by first disabling all relational constraints between affected tables. Subsequently the tables are duplicated in the destination database by deleting extinct records, inserting new records and updating those records that were modified. Exceptions are the configuration change tracking tables 188(a) where only the insertions will take place. For details about configuration change tracking tables 188, see U.S. Ser. No. 10/438,581. After all the admin data is duplicated, the relational constraints previously disabled are re-enabled.

Time Shifting

The field "date_updated" that serves as timestamp of the last change to each record is reset to the date/time of the actual time of migration. In configuration change tables 188, the actual changes made are recorded in change info tables 193; the configuration change is entered in these tables along with an indication that the change was made by the Trackwise Configuration Migrator.

Config Snapshot Table 133

The table is defined as follows:

```
MS SQL Server definition:
CREATE TABLE
    CONFIG_SNAPSHOT (
        TABLE_NAME VARCHAR(20) NOT NULL,
        MAX_DATE_UPDATED DATETIME NOT NULL,
        ROW_COUNT INT NOT NULL,
        DATE_UPDATED DATETIME NOT NULL
    )
Oracle definition:
CREATE TABLE
    CONFIG_SNAPSHOT (
        TABLE_NAME VARCHAR2(20) NOT NULL,
        MAX_DATE_UPDATED DATE NOT NULL,
        ROW_COUNT NUMBER(12) NOT NULL,
        DATE_UPDATED DATE NOT NULL
    )
```

The columns of this table are: table_name, max_date_updated, row_count (which is the number of records from the given table), and date_updated. Records in this table will represent all the configuration tables, one record per table. The table name is specified in the "table_name" column. The 'max_date_updated column will contain the MAX(date_updated) of the corresponding table. The 'Row_Count' column will contain the COUNT(*) of all records in the corresponding table except for Admin Audit Trail tables. For those, the Row_Count column will contain MAX(id) for the respective table. The 'date_updated' column will indicate the timestamp for the time at which each record in the Config_snapshot table was created.

For each table, MAX(date_updated) and COUNT(*) is compared between source and destination databases. If all relevant tables pass this test, the newly created snapshot table is populated with one record for each relevant table containing table name, MAX(date_updated) and COUNT(*) as above and current date/time for Config_snapshot(date_updated). Should a discrepancy between databases be found, the snapshot table is not created; instead the user is notified of the problem and given a list of all tables where data differs between databases.

MIGRATOR Signoff Table 130

This table is defined as follows:

```
MS SQL Server definition:
CREATE TABLE
    MIGRATOR_Signoff(
        id              INT NOT NULL,
        login_id        INT NOT NULL REFERENCES LOGIN(id),
        date_updated    DATETIME NOT NULL
)
Oracle definition:
CREATE TABLE
    MIGRATOR_Signoff(
        id              NUMBER(12) NOT NULL,
        login_id        NUMBER(12) NOT NULL
                        REFERENCES LOGIN(id),
        date_updated    DATE NOT NULL
)
```

The columns of the table are id, login_id and date_updated. "id" is a number used to uniquely identify records in the table. "login_id" is a reference to a record in the Login table that identifies a person and contains their username and encrypted password.

For each record in this table, a user with a corresponding "person_relation_id", being an ID in the Person_relation table, needs to sign off, thereby providing her/his approval to the migration of the configuration data. Only once all configured "sign off" approvals have been obtained, the Trackwise Configuration Migrator will be ready to perform the migration. Sign off is executed by providing an electronic signature, which consists of the user entering her/his unique User ID, her/his password and pressing a "Sign off" button.

The Sign Off screen will show the list of persons whose electronic signatures (username/password) are still required. When one of those persons enters her/his User ID and password and clicks "Submit", the credentials are verified and if successful, her/his name will be removed from the list of required Sign Off users. If a Sign Off attempt is unsuccessful, a warning box notifies the user of the error and the user may have another attempt to sign off. After a given number of failed attempts, which is a configurable number, the Trackwise Configuration Migrator will terminate, and before doing so, send out an alert notification to persons who are configured as "Admin Users". When all required "Sign Off" users have successfully signed off, the "Sign Off" process is complete, the "Sign Off" button on the main Trackwise Configuration Migrator screen is replaced with "Sign Off completed" text. If the Trackwise Configuration Migrator is exited or timed out, the entire "Sign Off" process will be repeated anew.

Details of Updating the Configuration Tables of the Destination Database from the Configuration Tables of the Source Database As indicated above, the configuration tables of the destination database are compared record-by-record with the configuration tables of the source database and the records are updated such that at the end of the process, the configuration tables of the source and destination databases are have identical records. The updating process thus involves deleting records, modifying records, and inserting records.

Deleting

For each table, the application first checks for the records that were removed during the configuration and testing, i.e. records that exist in the original production database but not in the source database. This is accomplished by first selecting all records in id column of a current table from both source and destination databases, as shown by the following query:

```
SELECT
    id
FROM
    sourcedb.tablename
SELECT
    id
FROM
    proddb.tablename
```

Subsequently, for every record in the destination database whose 'id' is not found in the source database the following command is executed:

```
DELETE
FROM
    proddb.tablename
WHERE
    id = <id>
```

Any exceptions generated at this point will be caught, analyzed and the appropriate message will be appended to the output stream to be displayed on the user's browser.

Updating

For records that that where updated in the source database, the updates need to be copied. The determination of whether a record was updated is made by comparing the date_updated field of the table with MAX(date_updated) value that had been stored in the CONFIG_SNAPSHOT table. This is accomplished by taking the results of the first query above

```
SELECT
    id
FROM
    sourcedb.tablename t, sourcedb.config_snapshot s
WHERE
    t.date_updated>s.max_date_updated
    and s.table_name = <table_name>
and using query
SELECT
    id
FROM
    proddb.tablename
``` and only using those records whose ids were included in the results of the first query.

For such records, the fields in the production database will be updated with fields from corresponding records in the source database. Should any referential integrity violations occur, they would be logged and displayed.

Inserting

All the new records, i.e. the records that are present in the source database but not in the production database, need to be inserted in the production database. We determine that by first selecting all records from production database:

```
        SELECT
            id
        FROM
            proddb.tablename
arranging all the results in a string and running a query
        SELECT
            *
        FROM
            source.tablename
```

And only inserting those records whose IDs are not among the results of the first query.

Notification

Every step of the way, the status messages will be appended to the output stream for the user to see.

The messages will be of the format:

Performed update on table A

Performed delete on table A

Performed insert on table A

Clean Up

Upon completion of the importation process, the DATE_UPDATED field in Config_snapshot 133 is updated to the date of the actual time of migration, logoff requests that were entered are withdrawn as described above, the popup window that displays progress closes, and the user is returned to the main page.

CONCLUSION

The foregoing Detailed Description has disclosed a technique for ensuring that migration from a first configuration of a system to a second configuration thereof will not cause changes made in the first configuration prior to the migration to be lost, has disclosed the technique in sufficient detail that those skilled in the relevant technologies can practice the technique, and has disclosed the best mode known to the inventors of implementing their technique. It will, however; be immediately apparent to those skilled in the relevant technologies that many other implementations are possible. For example, the disclosed embodiment uses a snapshot table to detect changes in the first configuration tables; however, other embodiments may use other techniques for detecting the changes, including keeping a copy of the first configuration tables for making the comparison or making a digest of the first configuration tables. What technique is used will typically depend on the amount of detailed information that the comparison needs to provide. The extent to which the migration technique needs to provide for logging off users and receiving signoffs for changes will depend on the size, complexity, and purpose of the system in which the technique is being employed. The particular forms in which the information required for the technique is kept will also depend on the size, complexity, purpose, and past history of the system. For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A method of migrating from configuration m of a system to a configuration m+1 thereof, the system's configuration being defined by first configuration tables in a database and the method comprising the steps performed by the system of:

making second configuration tables that define configuration m+1;

getting an approval by an approving user of one or more users of the system for the migration;

making a determination whether the first configuration tables still define configuration m; and if the first configuration tables still define configuration m, using the second configuration tables to modify the first configuration tables such that the first configuration tables define configuration m+1.

2. The method set forth in claim 1 further comprising the step of:

making a snapshot of the first configuration tables prior to making the second configuration tables, the snapshot not being a copy of the first configuration tables but permitting detection of changes in the first configuration tables; and in the step of making a determination, the snapshot is used to make the determination.

3. The method set forth in claim 2 wherein:

the snapshot is compared with the first configuration tables.

4. The method set forth in claim 1 wherein the step of making second configuration tables comprises the steps of:

making a copy of the first configuration tables; and modifying the copy.

5. The method set forth in claim 4 further comprising the step of:

making a snapshot of the first configuration tables when the copy is made, the snapshot not being a copy of the first configuration tables but permitting detection of changes in the first configuration tables; and in the step of making a determination, the snapshot is used to make the determination.

6. The method set forth in claim 5 wherein:

in the step of making a determination, the snapshot is compared with the first configuration tables.

7. The method set forth in claim 4 wherein:

the step of making a copy of the first configuration tables is part of a step of copying the database; and the method further includes the step of testing the copied database with configuration m+1.

8. The method set forth in claim 4 wherein the system performs the method under control of a user of one or more users of the system; and the method further comprises the step of:

having any other user log off before the step of making a copy of the first configuration tables.

9. The method set forth in claim 8 further comprising the step of:

also having any other user log off before the step of making a determination.

10. The method set forth in claim 1 wherein the system performs the method under control of a user of one or more users of the system and the method further comprises the steps performed when the comparison indicates that the first configuration tables no longer define configuration m of:

notifying the user that the first configuration tables no longer define configuration m; and if the user so indicates, overwriting the first configuration tables with the second configuration tables.

11. The method set forth in claim 1 wherein:
in the step of using the second configuration tables to modify the first configuration tables, the first configuration tables are modified record-by-record.

12. The method set forth in claim 11 wherein
the system performs the method under control of a user of one or more users of the system and
the method further comprises the steps performed when the comparison indicates that the first configuration tables no longer define configuration m of:
notifying the user that the first configuration tables no longer define configuration m; and
if the user so indicates, overwriting the first configuration tables with the second configuration tables.

13. The method set forth in claim 1 wherein:
the step of getting the approval is performed prior to the step of making a determination.

14. The method of claim 13 wherein:
the step of getting the approval is performed immediately prior to the step of making a determination.

15. The method set forth in claim 1 wherein
the system performs the method under control of a user of one or more users of the system; and
the method further comprises the step of:
having any other user log off before the step of making a determination.

16. The method set forth in claim 1 wherein:
the database further includes a configuration change tracking table; and
in the step of using the second configuration tables to modify the first configuration tables, the modifications to the first configuration tables are recorded in the configuration change tracking table.

17. The method set forth in claim 16 wherein:
the modifications are recorded in the configuration change table together with an indication that they were made during a migration from one configuration to another.

18. Apparatus employed in a system having a processor and a database which includes first configuration tables that define a configuration m of the system to migrate the system to a configuration m+1 thereof, the apparatus comprising:
a copy of the first configuration tables;
a snapshot table which can be used by the processor to detect whether the first configuration tables still define configuration m,
a signoff table in the database which indicates one or more approving users of one or more users of the system, the approving users' approval being required before the configuration m can be migrated to the configuration m+1; and the processor operating under control of a user of the system to modify the copy of the first configuration tables to produce second configuration tables that define configuration m+1, compare the first configuration tables with the snapshot table to determine whether the first configuration tables still define configuration m, and if the first configuration tables do so, use the second configuration tables to modify the first configuration tables so that the first configuration tables define configuration m+1, the processor further operating under control of the user to obtain approval from each of the approving users before using the second configuration tables to modify the first configuration tables.

19. The apparatus set forth in claim 18 wherein
when the first configuration tables no longer define configuration m, the processor operates to notify the user thereof and to respond to an indication from the user to so do by overwriting the first configuration tables with the second configuration tables.

20. The apparatus set forth in claim 18 further comprising:
a copy of the database, the copied database including the copy of the first configuration tables,
the processor further operating under control of the user to test configuration m+1 using the second configuration tables and the copied database.

21. The apparatus set forth in claim 18 wherein:
the processor operates under control of the user to make the snapshot table when the copy of the first configuration tables is made.

22. The apparatus set forth in claim 18 wherein:
the processor operates under control of the user to log any other users of the database off before making the copy of the first configuration tables and also before comparing the first configuration tables with the snapshot table.

23. The apparatus set forth in claim 18 further comprising:
a configuration change tracking table in the database; and
the processor further recording the modifications to the first configuration tables in the configuration change tracking table.

24. A data storage device, characterized in that:
the data storage device contains code which when executed by a processor performs the method set forth in claim 1.

25. A method of migrating from configuration m of a system to a configuration m+1 thereof, the system's configuration being defined by first configuration tables in a database, the database further including a configuration change tracking table, and the method comprising the steps performed by the system of:
making second configuration tables that define configuration m+1;
making a determination whether the first configuration tables still define configuration m;
if the first configuration tables still define configuration in, using the second configuration tables to modify the first configuration tables such that the first configuration tables define configuration m+1; and
recording any modification to the first configuration tables in the configuration change tracking table together with an indication that the modification was made during a migration from one configuration to another.

* * * * *